United States Patent
Amrhein et al.

(10) Patent No.: US 9,244,630 B2
(45) Date of Patent: Jan. 26, 2016

(54) IDENTIFYING AND ACCESSING REFERENCE DATA IN AN IN-MEMORY DATA GRID

(71) Applicant: International Business Machines Corporation, Armonk, NY (US)

(72) Inventors: Dustin K. Amrhein, Zachary, LA (US); Douglas C. Berg, Rochester, MN (US); Kulvir S. Bhogal, Fort Worth, TX (US); Nitin Gaur, Round Rock, TX (US); Christopher D. Johnson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 13/780,408

(22) Filed: Feb. 28, 2013

(65) Prior Publication Data
US 2014/0244953 A1 Aug. 28, 2014

(51) Int. Cl.
*G06F 12/00* (2006.01)
*G06F 3/06* (2006.01)
*G06F 17/30* (2006.01)
*G06F 11/00* (2006.01)

(52) U.S. Cl.
CPC ............ *G06F 3/0683* (2013.01); *G06F 3/0614* (2013.01); *G06F 11/00* (2013.01); *G06F 17/30584* (2013.01)

(58) Field of Classification Search
CPC ................ G06F 3/0614; G06F 3/0683; G06F 17/30584; G06F 17/30; G06F 17/30607; G06F 9/5072
See application file for complete search history.

(56) References Cited

U.S. PATENT DOCUMENTS

| | | | |
|---|---|---|---|
| 7,461,077 B1 | 12/2008 | Greenwood | |
| 8,001,142 B2 * | 8/2011 | Gopinath et al. | 707/770 |
| 2002/0194015 A1 | 12/2002 | Gordon et al. | |
| 2009/0259683 A1 * | 10/2009 | Murty | 707/103 R |
| 2011/0041006 A1 | 2/2011 | Fowler | |
| 2011/0173410 A1 | 7/2011 | Castillo et al. | |
| 2012/0246202 A1 * | 9/2012 | Surtani et al. | 707/812 |
| 2012/0278422 A1 | 11/2012 | Oliver et al. | |

FOREIGN PATENT DOCUMENTS

| | | |
|---|---|---|
| CN | 102333108 A | 1/2012 |
| CN | 102541927 A | 7/2012 |
| WO | 2012167378 A1 | 12/2012 |

OTHER PUBLICATIONS

Radford et al, "An Information Grid Solution Using Avaki Data Grid Software", IBM Corporation, 2004, pp. 1-64.

(Continued)

*Primary Examiner* — Kevin Verbrugge
*Assistant Examiner* — Alan Otto
(74) *Attorney, Agent, or Firm* — Cantor Colburn LLP; Rahan Uddin (57) ABSTRACT

Embodiments relate to providing normalization techniques for reference data in an in-memory data grid. An aspect includes monitoring object creation and access in an in-memory data grid and identifying reference data in an object field of a plurality of object instances. A reference map for the object field is created and the reference map is replicated across all partitions of the in-memory data grid. The reference data of an embodiment is stored in the reference map and the object field is updated to identify the reference map. Accordingly, the reference data may be accessed using the created reference map.

16 Claims, 5 Drawing Sheets

(56) References Cited

OTHER PUBLICATIONS

Janis et al, "Fully Qualified Unique Name in a Reference-Data Operand", Technical Disclosure, IP Com,, Inc., Mar. 17, 2005, 2 pages.

UK International Search Report and Written Opinion for International Appliction No. PCT/IB2014/058609; International Filing Date Jan. 28, 2014; Date of Mailing: Jun. 5, 2014; 9 pages.
U.S. Appl. No. 14/066,725; Non-Final Office Action; filed Oct. 30, 2013; Date Mailed: Apr. 20, 2015; 21 pages.

* cited by examiner

IDENTIFYING AND ACCESSING REFERENCE DATA IN AN IN-MEMORY DATA GRID

BACKGROUND

The present invention relates generally to in-memory data grids, and more specifically, to identifying reference data, creating a reference map for the reference data, and replicating the reference map across multiple partitions of an in-memory data grid.

A contemporary in-memory data grid (IMDG) partitions and stores data in memory across an elastic pool of interconnected servers. Data partitioning provides parallelism and enables an IMDG to scale its capacity. For example, in response to an increase in data, the IMDG may simply add servers to handle the growing workload. The partitioned data is then typically load-balance by re-distributing the partitioned data across the newly added servers on which the IMDG is hosted. In a contemporary IMDG, the data may be stored redundantly on multiple servers to ensure high availability of the data in case a server or network link fails.

BRIEF SUMMARY

According to an embodiment, a computer-implemented method is provided for applying normalization techniques to reference data in the IMDG. The object creation and access in an in-memory data grid are monitored and reference data is identified in an object field of a plurality of object instances. A reference map for the object field is created and the reference map is replicated across all partitions of the in-memory data grid. The reference data is stored in the reference map and the object field is updated to identify the reference map. The reference data may then be accessed using the created reference map.

According to another embodiment, a computer system, including a memory having computer readable computer instructions and a processor for executing the computer readable instructions, is configured to provide normalization techniques for reference data in the IMDG. The object creation and access in an in-memory data grid are monitored and reference data is identified in an object field of a plurality of object instances. A reference map for the object field is created and the reference map is replicated across all partitions of the in-memory data grid. The reference data is stored in the reference map and the object field is updated to identify the reference map. The reference data may then be accessed using the created reference map.

According to another embodiment, a computer program product, including a computer readable storage medium having program code embodied therewith, is provided for executing program code to provide normalization techniques for reference data in the IMDG. The object creation and access in an in-memory data grid are monitored and reference data is identified in an object field of a plurality of object instances. A reference map for the object field is created and the reference map is replicated across all partitions of the in-memory data grid. The reference data is stored in the reference map and the object field is updated to identify the reference map. The reference data may then be accessed using the created reference map.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments disclosed herein identify reference data, create a reference map for the reference data, and replicate the reference map across multiple partitions of an in-memory data grid (IMDG). According to embodiments, the reference data may be quickly accessed using the created reference map. The embodiments disclosed herein apply normalization techniques to reference data in the IMDG, thus providing the conservation of a significant amount of memory in an IMDG, while remaining completely transparent to a user of the IMDG.

Developers often use IMDGs to store application objects with little or no changes to their structure. While this may be fine from a functional perspective, it is often the case that field values in an object are essentially reference data. In many cases, multiple object instances may refer to the same value resulting in recurring instances of this reference data in the IMDG. Given enough instances of the same data value, this may constitute a significant usage of memory thereby unnecessarily lowering the capacity of the in-memory data grid.

IMDG typically partitions data across multiple interconnected java virtual machines (JVMs) to improve scalability. If there is an increase in data, new JVMs are added to existing set of JVMs and data partitions are re-distributed across newly added JVMs. Due to this partitioning scheme, data access by a client may require spanning across several JVMs to access a composite set of data. This involved multiple remote procedural calls by the client and impacts performance.

Embodiments disclosed herein provide a method, system, and computer-program product that applies normalization techniques to reference data in the IMDG. According to embodiments, object creation and access in an in-memory data grid are monitored and reference data is identified in an object field of a plurality of object instances. A reference map for the object field is created and the reference map is replicated across all partitions of the in-memory data grid. The reference data of embodiments disclosed herein is stored in the reference map and the object field is updated to identify the reference map. According to embodiments, the reference data may be accessed using the created reference map.

It is understood in advance that although this invention includes a detailed description on cloud computing, implementation of the teachings recited herein are not limited to a cloud computing environment. Rather, embodiments of the invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
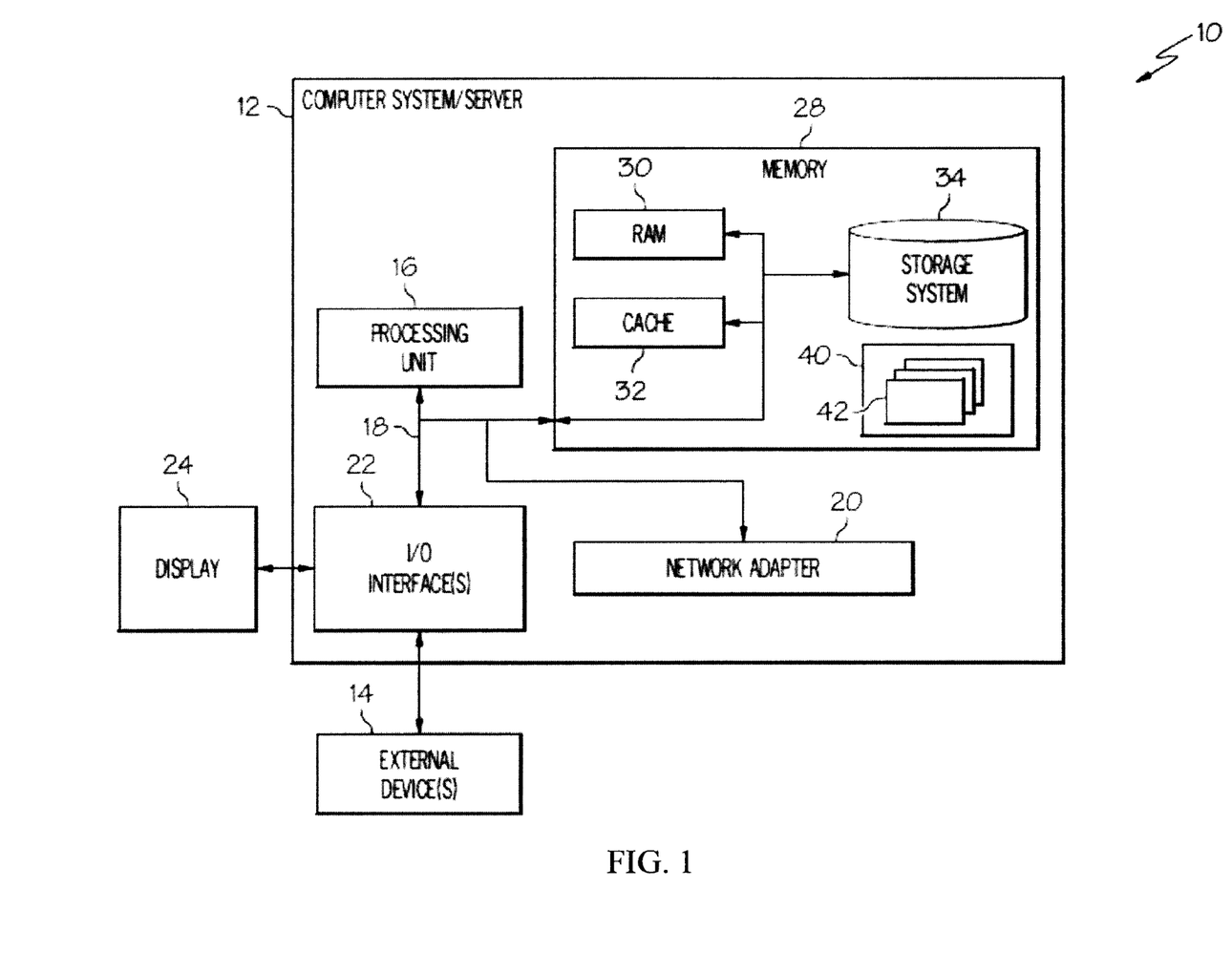
FIG. 1 depicts a cloud computing node according to an embodiment of the present invention.

Referring now to FIG. 1, a block diagram of a cloud computing node for handling reference data in an in-memory data grid (IMDG) of an embodiment is shown. Cloud computing node 10 is only one example of a suitable cloud computing node and is not intended to suggest any limitation as to the scope of use or functionality of embodiments described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device, also referred to as a processing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 may include a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
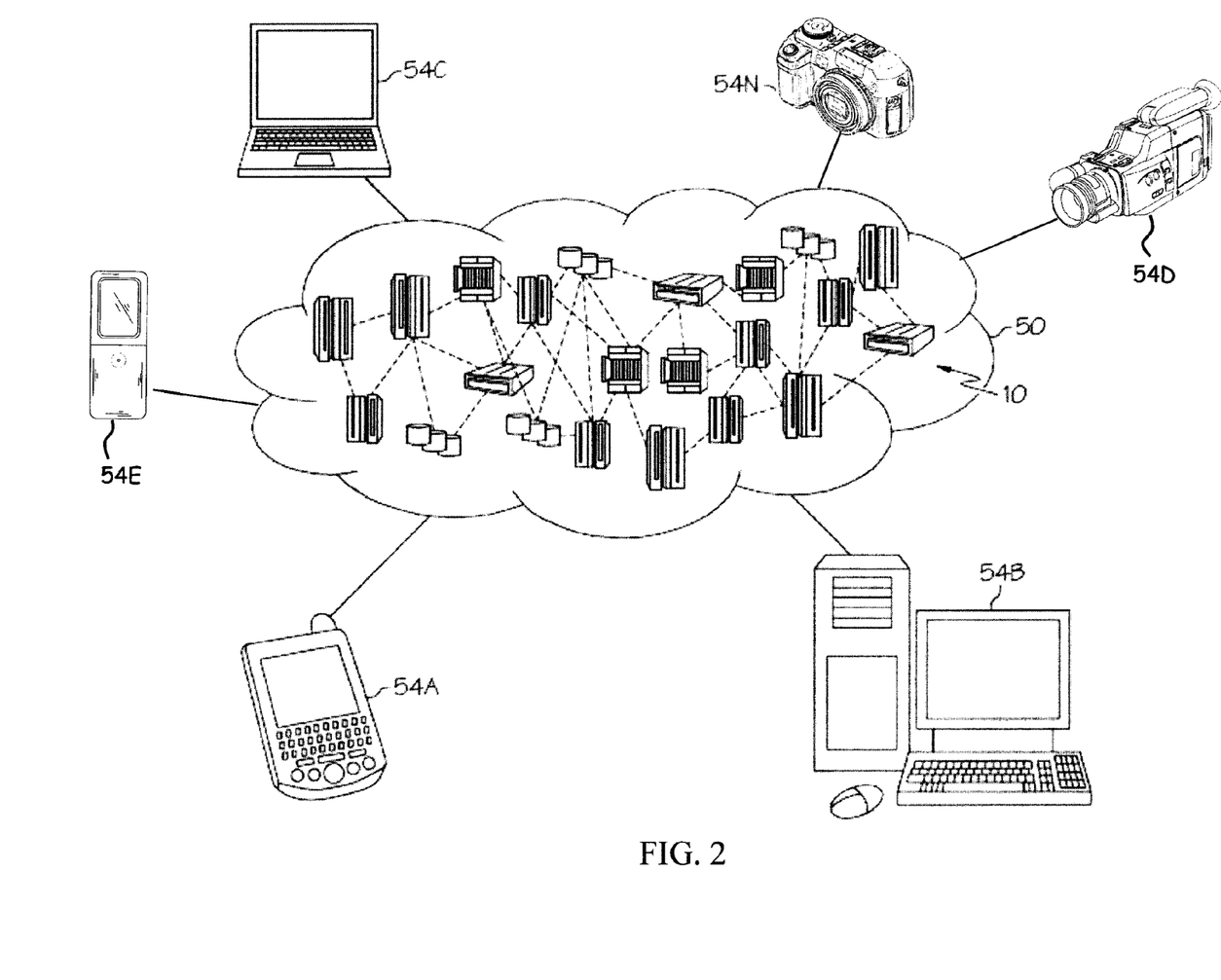
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, digital video camera 54D, digital audio recording device 54E, and/or digital still camera 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
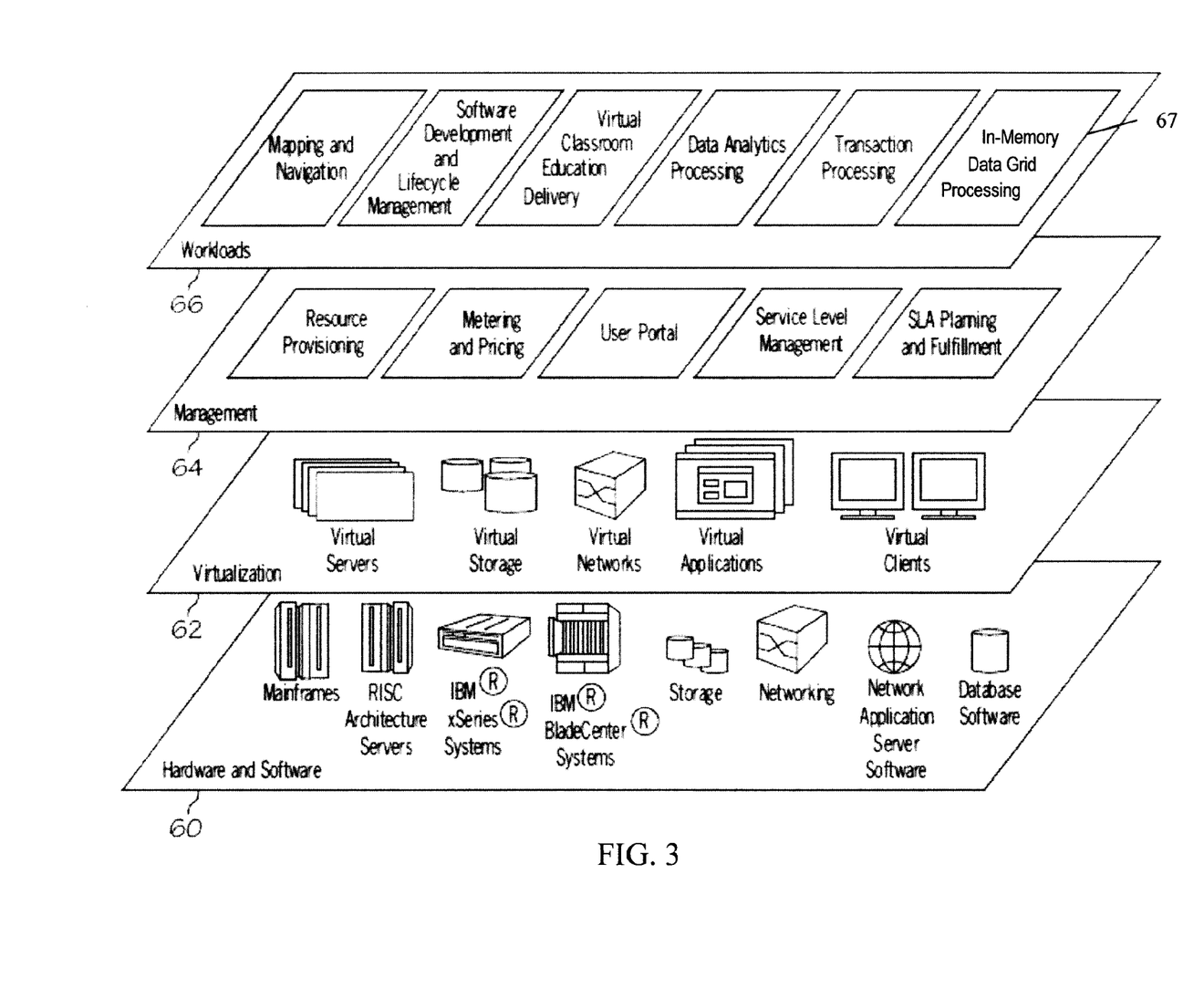
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and in-memory data grid processing 67.

Figure 4:
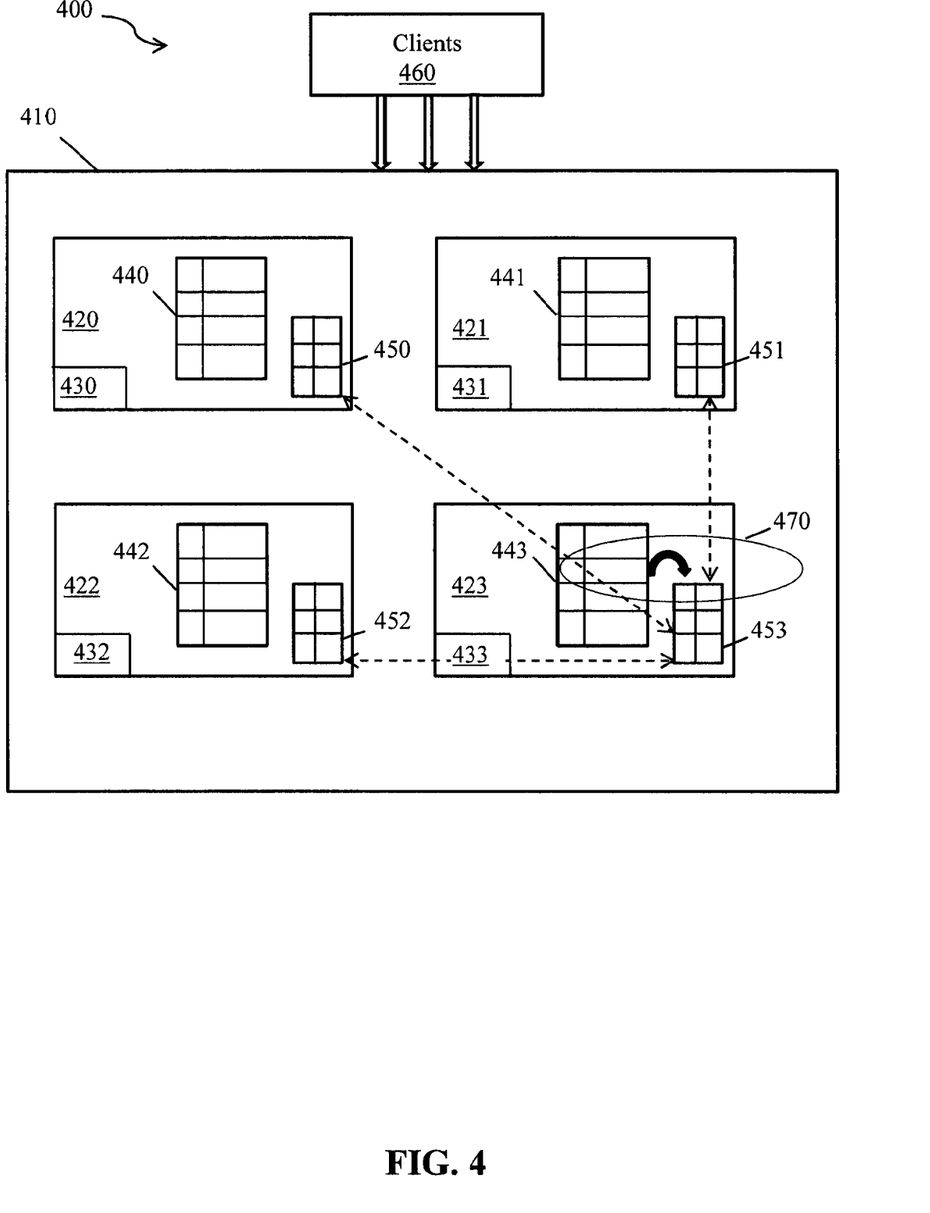
FIG. 4 depicts an in-memory data grid (IMDG) topology according to an embodiment.

Referring to FIG. 4, an in-memory data grid (IMDG) topology 400 of an embodiment is shown. An IMDG 410 of an embodiment may include a plurality of grid containers 420, 421, 422, 423 each of which may include one or more partitions therein. Each grid container 420, 421, 422, 423 may include a reference data agent 430, 431, 432, 433, a map 440, 441, 442, 443, and an internal reference map 450, 451, 452, 453. Each internal reference map 450, 451, 452, 453 may be created in the same grid container 420, 421, 422, 423 as the existing objects and are stored in each partition of the grid container 420, 421, 422, 423.

Clients 460 may connect to the IMDG 410 and are attached to the whole grid. Any entity that is attached to the IMDG 410 with any kind of request may be a client 460. The elements of the IMDG topology 400 will be discussed in greater detail with reference to FIG. 5.

Figure 5:
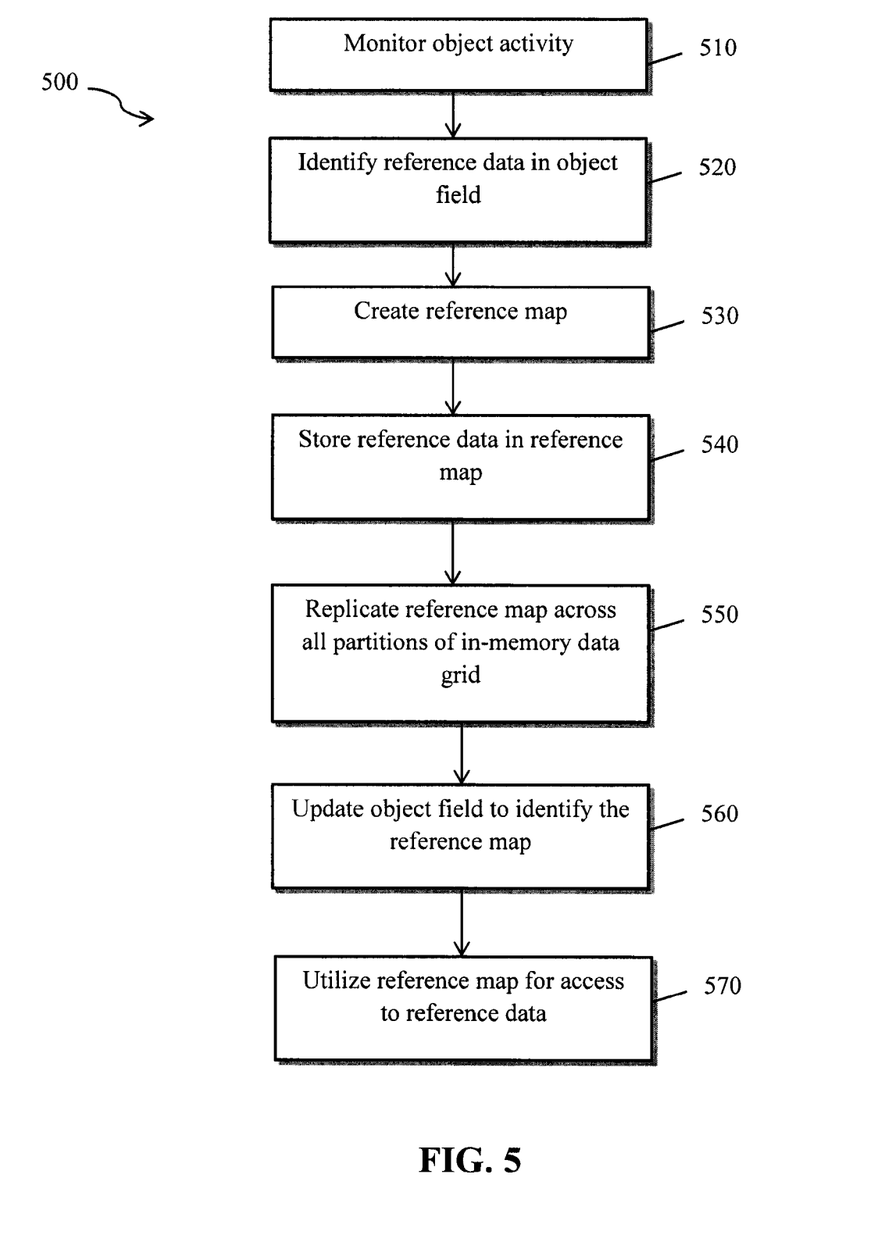
FIG. 5 depicts a flow diagram depicting an operation for handling reference data in an IMDG according to an embodiment.

With reference now to FIG. 5, a flow diagram depicting an operation 500 for handling reference data in an in-memory data grid (IMDG) 410 according to an embodiment is shown. The operation 500 of an embodiment may be implemented using the processing unit 16, as described in FIG. 1, to apply normalization techniques to reference data in the IMDG 410.

At block 510, an embodiment monitors the object creation and access in an IMDG 410. According to an embodiment, an inspector of the IMDG 410 may inspect the objects as they are inserted into and retrieved from the IMDG 410 by user code. The monitoring of objects according to an embodiment may include a continual process that runs in the IMDG 410 to inspect queries, inserts, retrievals, updates, and other object related actions. This process keeps track of object data and correlates the usage of that data from multiple clients 460.

At block 520, the static reference data in an object field is identified in a plurality of object instances according to an embodiment. Over time, the IMDG 410 will analyze the contents of object instances and identify fields that contain static reference data. For example, the inspector of the IMDG 410 may identify that a set of data in one or more fields of an object is static reference data by evaluating its size and access patterns. The size, access patterns, and scope of the reference data may be frequently evaluated and updated to ensure that the reference data fits in available memory to avoid affecting the working set. The identified reference data of an embodiment is preferably small enough to fit in available memory such that the working set is not affected. Additionally, the identified reference data of an embodiment is infrequently updated (e.g., 99% read).

The inspector of the IMDG 410 may further identify the scope of the reference data. For example, the inspector of the IMDG 410 may determine whether an entire map 440, 441, 442, 443 is reference data or whether only some of the data in a map entry qualify as reference data. The reference data is preferably co-located in the same grid container 420, 421, 422, 423 or the same partition according to an embodiment.

At block 530, a reference map 450, 451, 452, 453 is created for the static reference data identified in the one or more object fields according to an embodiment. The reference map 450, 451, 452, 453 of an embodiment is a new, distributed internal map, and is automatically created for the identified reference data. When reference data is found, the IMDG 410 of an embodiment will automatically generate a key for each unique reference data value and store the reference data in the internal reference map 450, 451, 452, 453 with the newly generated key, as shown in block 540. According to an embodiment the key may be a hash key. According to another embodiment, additional reference maps may be created that includes a reverse index based on query patterns.

At block 550, the reference map 453 of an embodiment may be replicated across all partitions of the IMDG 410, as shown in block 470 in FIG. 4. According to an embodiment, the newly created reference maps 450, 451, 452 are configured to automatically replicate data across multiple grids or grid partitions (e.g., zones or multi Master Data centers). The replication may utilize a mechanism selected from a group comprising asynchronous replication, synchronous replication, multi-master replication (MMR), and zone replication. In an embodiment, the data in the reference maps 450, 451, 452, 453 are subjected to known replication mechanisms in the IMDG 410. The data may be replicated in a synchronous or asynchronous manner, and it may be replicated entirely within a grid or it could be replicated across multiple grids according to an embodiment.

According to an embodiment, the reference map 450, 451, 452, 453 is configured to reside in all grid containers 420, 421, 422, 423 of the IMDG 410, including the replicated grid as the Multi-Master Grid. Once the reference map 450, 451, 452, 453 of an embodiment is created it may be replicated to all the grid containers 420, 421, 422, 423. According to an embodiment, either an asynchronous update approach or a synchronous approach may be utilized as a map replication mechanism.

An asynchronous update approach of an embodiment may change the replication mode for the reference map 450, 451, 452, 453 from a solely key-based routing map to a MMR map where each map is a peer. An asynchronous update approach leverages a known MMR mechanism wherein each replicated reference map 450, 451, 452, 453 is a duplicate of one another. When one reference map is updated, the changes will spray out to all reference maps 450, 451, 452, 453 in the IMDG 410 according to an embodiment. Accordingly, clients 460 can still treat the map as a normal, fixed-partition map. For example, updates to the reference data would be automatically synced up with its peers, and are all locally readable. Local shard access (e.g., via queries) would now automatically be able to see all the data in memory. According to an embodiment, the reference map 450, 451, 452, 453 may be co-located with all other processes in each partition of the IMDG 410.

A synchronous update approach of an embodiment may keep the replication mode the same, but instead capture updated events and spray them over all the partitions of the IMDG 410 using a reference data agent 430, 431, 432, 433, for example. According to an embodiment, a client 460 may invoke the reference data agent 430, 431, 432, 433 to update or edit the reference maps 450, 451, 452, 453.

Accordingly, an embodiment may utilize known MMR or zone replication (e.g., synchronous or asynchronous replication) to ensure that reference data is available and co-located for faster access and improved performance.

At block 560, the one or more object fields of an embodiment are updated to identify the reference map 450, 451, 452, 453. According to an embodiment, the original object is updated so that the reference data fields refer to the key of the actual value inserted into the internal map. Accordingly, when user code retrieves an original object from the IMDG 410, whether via a query or direct access, the IMDG 410 may resolve the reference to the internal reference map 450, 451, 452, 453 and return the object in its original form to the user. Moreover, when a user updates the original object in such a way that it affects the reference data value, the operation to the value in the internal reference map 450, 451, 452, 453 is resolved to ensure that the update and replication may occur according to an embodiment.

At block 570, the reference data may now be quickly accessed using the reference map 450, 451, 452, 453 according to an embodiment. An example case that utilizes the reference map 450, 451, 452, 453 of an embodiment in will now be discussed greater detail with an example.

In this particular example, an IMDG 410 of an embodiment stores Address objects keyed by the address ID:
AddressMap:
AddressId→Address.

The Address object may contain many attributes, including one called 'countryName' that stores the name of a country: Address.countryName.

A user then creates an Address object instance where the 'countryName' attribute equals 'United States of America.' Over time, the inspector of an embodiment recognizes that the 'countryName' attribute is a good candidate for reference data, and it creates a new internal reference map called 'CountryMap.' This new reference map uses an auto-generated key to store 'countryName' values. For instance, the first entry may be 'United States of America', and its key may be '1' according the following instruction:
CountryMap.insert("1", "United States of America").

A user may issue the following query to get an Address object instance:
SELECT addr FROM AddressMap addr WHERE addr.countryName="United States of America"

Upon seeing this query, the IMDG 410 of an embodiment intercepts the query and rewrites it to use the internal map created earlier:
SELECT addr FROM Addr addr join addr.countryMap c WHERE c.countryName="United States of America"

The IMDG 410 of an embodiment may automatically resolve the references to ensure that the Address instance was returned to the user in its original form with the following instructions:
// retrieve object and resolve references
address.setCountry(countryMap.get("1"))
return address;

If a user later inserts or updates Address instances that affect the 'countryName' value, the IMDG 410 of an embodiment may automatically carry out the operation on the internal map using the following instructions:
// user inserts new address
address.setCountry("United Kingdom")
addressMap.insert(key, address)
// grid intercepts and rewrites in a transparent manner
countryMap.insert("2", "United Kingdom")
address.setCountry("2")
addressMap.insert(key, address)

Accordingly, embodiments disclosed herein provide a method, system, and computer-program product for handling reference data in an in IMDG 410. According to embodiments, object creation and access in an in-memory data grid are monitored and reference data is identified in an object field of a plurality of object instances. A reference map 450, 451, 452, 453 for the object field is created and the reference map 450, 451, 452, 453 is replicated across all partitions of the in-memory data grid. The reference data of embodiments disclosed herein are stored in the reference map 450, 451, 452, 453 and the object field is updated to identify the reference map 450, 451, 452, 453. According to embodiments, the reference map 450, 451, 452, 453 may be utilized future for speedy access to the reference data.

Technical effects and benefits include the conservation of a significant amount of memory in an IMDG 410, while remaining completely transparent to a user of the IMDG 410.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer system, comprising:
    a memory having computer readable computer instructions; and a processor for executing the computer readable instructions to perform a method comprising:
    monitoring, by a processing device, object creation and access in an in-memory data grid;
    identifying reference data in an object field of a plurality of object instances in the in-memory data grid, each of the plurality of object instances including an instance of the same data value in the object field;
    creating a reference map for the object field;
    replicating the reference map across all partitions of the in-memory data grid;
    storing the reference data in the reference map;
    updating the object field to identify the reference map; and
    accessing the reference data using the reference map, wherein upon receiving a query that refers to the object field in an object instance, the accessing includes automatically modifying, by the processing device, a portion of the query to reference the object field in the reference map.

2. The computer system of claim 1, wherein the monitoring of the object creation and access further comprises running a continuous process in the in-memory data grid to inspect a group comprising of queries, inserts, retrievals, and updates to the object.

3. The computer system of claim 1, wherein the identification of reference data further comprises:
    evaluating size, access patterns, and scope of the reference data to ensure that the reference data fits in available memory; and
    determining whether the identified reference data is infrequently updated.

4. The computer system of claim 1, wherein the reference data is co-located.

5. The computer system of claim 1, wherein the method further comprises:
    generating a key for each unique reference data value in response to creating the reference map, and storing the reference data in the reference map with the newly generated key.

6. The computer system of claim 1, wherein the replication utilizes a replication mechanism selected from a group comprising asynchronous replication, synchronous replication, multi-master replication, and zone replication.

7. The computer system of claim 1, wherein the method further comprises:
    utilizing a partitionable key to ensure that related reference data is co-located.

8. The computer system of claim 1, wherein the replicating of the reference data further comprises duplicating the reference data in more than one partition.

9. A computer program product, the computer program product comprising:
a non-transitory computer readable storage medium having program code embodied therewith, the program code executable by a processing device for:
monitoring, by a processing device, object creation and access in an in-memory data grid;
identifying reference data in an object field of a plurality of object instances in the in-memory data grid, each of the plurality of object instances including an instance of the same data value in the object field;
creating a reference map for the object field;
replicating the reference map across all partitions of the in-memory data grid;
storing the reference data in the reference map;
updating the object field to identify the reference map; and
accessing the reference data using the reference map, wherein upon receiving a query that refers to the object field in an object instance, the accessing includes automatically modifying, by the processing device, a portion of the query to reference the object field in the reference map.

10. The computer program product method of claim 9, wherein the monitoring of the object creation and access further comprises running a continuous process in the in-memory data grid to inspect a group comprising of queries, inserts, retrievals, and updates to the object.

11. The computer program product method of claim 9, wherein the identification of reference data further comprises:
evaluating size, access patterns, and scope of the reference data to ensure that the reference data fits in available memory; and
determining whether the identified reference data is infrequently updated.

12. The computer program product method of claim 9, wherein the reference data is co-located.

13. The computer program product method of claim 9, wherein the program code is further executable by the processing device for:
generating a key for each unique reference data value in response to creating the reference map, and
storing the reference data in the reference map with the newly generated key.

14. The computer program product method of claim 9, wherein the replication utilizes a replication mechanism selected from a group comprising asynchronous replication, synchronous replication, multi-master replication, and zone replication.

15. The computer program product method of claim 9, wherein the program code is further executable by the processing device for:
utilizing a partitionable key to ensure that related reference data is co-located.

16. The computer program product method of claim 9, wherein the replicating of the reference data further comprises duplicating the reference data in more than one partition.

* * * * *